US007238406B2

(12) United States Patent
Peterson

(10) Patent No.: US 7,238,406 B2
(45) Date of Patent: Jul. 3, 2007

(54) WALL SURFACING TEMPLATE

(75) Inventor: Robbie R. Peterson, McFarland, WI (US)

(73) Assignee: DaSa Enterprises, LLC, McFarland, WI (US)

( * ) Notice: Subject to any disclaimer, the term of this patent is extended or adjusted under 35 U.S.C. 154(b) by 364 days.

(21) Appl. No.: 10/964,957

(22) Filed: Oct. 14, 2004

(65) Prior Publication Data

US 2006/0080921 A1 Apr. 20, 2006

(51) Int. Cl.

*B32B 3/10* (2006.01)
*E04F 13/00* (2006.01)
*E04F 15/00* (2006.01)
*E04F 19/00* (2006.01)
*B44F 7/00* (2006.01)
*B44F 9/00* (2006.01)
*E04C 1/00* (2006.01)

(52) U.S. Cl. .................... 428/137; 428/131; 52/311.1; 52/314; 249/112

(58) Field of Classification Search ............... 52/311.1, 52/314; 101/127; 428/41.8, 131, 137; 249/16, 249/35, 55, 99, 102, 104, 112, 140
See application file for complete search history.

(56) References Cited

U.S. PATENT DOCUMENTS 2,964,800 A 12/1960 Dorsett
3,594,968 A * 7/1971 Johnson ...................... 52/390
3,602,476 A 8/1971 Iragorri
3,737,511 A * 6/1973 Dillon ........................ 264/256
3,759,481 A 9/1973 Scott
4,026,083 A 5/1977 Hoyt et al.
4,164,598 A * 8/1979 Wilhelm ..................... 428/48
4,239,820 A 12/1980 Salvador
4,349,588 A * 9/1982 Schiffer ...................... 427/230
4,363,145 A 12/1982 Kawesch
4,510,729 A 4/1985 Syring
4,644,719 A 2/1987 Salazar (Continued)

FOREIGN PATENT DOCUMENTS

CA 0208918 A2 * 12/1986

OTHER PUBLICATIONS

"I Can't Believe it's Not Brick", John Lehman, *Walls & Ceilings*, Feb. 2003, pp. 18-22 & p. 24.

*Primary Examiner*—Carl D. Friedman
*Assistant Examiner*—Hunter Dreidame
(74) *Attorney, Agent, or Firm*—Stiennon & Stiennon

(57) ABSTRACT

A template assembly for use in the production of a variable depth building wall surface, which may be simulative of multiple units separated by mortar joints, such as a simulated brick, stone, tile, or mosaic surface. The template assembly is formed of a backing sheet which is releasably attached to a substrate formed of nonwoven spunbond polyester material, which may be fiberglass reinforced. The substrate is a unitary sheet having a plurality of upwardly extending strips connected by a plurality of sidewardly extending strips. The strips define a plurality of openings within which simulated building units may be formed. A first layer is applied to a wall surface, the template backing is removed and the template adhered to the first layer, and then a second layer is applied over the template. When the template is removed, those areas corresponding to the template strips will be recessed from the second layer.

7 Claims, 1 Drawing Sheet

U.S. PATENT DOCUMENTS

| | | | | |
|---|---|---|---|---|
| 4,665,673 | A * | 5/1987 | Diana | 52/314 |
| 4,858,410 | A | 8/1989 | Goldman | |
| 5,186,983 | A | 2/1993 | Brown | |
| 5,268,137 | A | 12/1993 | Scott et al. | |
| 5,447,752 | A | 9/1995 | Cobb | |
| 5,494,372 | A | 2/1996 | Oliver et al. | |
| 5,502,941 | A * | 4/1996 | Zember et al. | 52/314 |
| 5,735,094 | A | 4/1998 | Zember | |
| 5,792,511 | A | 8/1998 | Oliver et al. | |
| 5,900,180 | A | 5/1999 | Scott et al. | |
| 5,942,072 | A | 8/1999 | McKinnon | |
| 6,164,037 | A | 12/2000 | Passeno | |
| 6,217,974 | B1 * | 4/2001 | Pacione | 428/95 |
| 6,237,294 | B1 | 5/2001 | Rygiel | |
| 6,528,120 | B2 | 3/2003 | Brown | |
| 6,620,464 | B2 | 9/2003 | Sciandra | |
| 6,652,907 | B1 | 11/2003 | Stever | |
| 6,702,559 | B1 * | 3/2004 | Norman | 425/65 |
| 6,808,667 | B2 | 10/2004 | Nasvik et al. | |
| 2005/0112276 | A1 * | 5/2005 | Rodriguez | |

* cited by examiner

WALL SURFACING TEMPLATE

BACKGROUND OF THE INVENTION

The present invention relates to templates for the preparation of building wall surfaces.

Brick and stone have been used as building components for thousands of years. Historically, modular brick units were used as structural elements, united by mortar, to define vertical walls, columns, and lintels. In more recent times, when steel frame or wood stick construction has been favored, brick has been applied as a veneer to a substructure. When used as veneer, the bricks still convey an appearance of solidity and permanence. Stone, tile, and other mortar-joined building elements produce a variable depth building surface with the mortar joint usually recessed from the surfaces of the building elements. The variable depth building surface provides an attractive appearance which changes with the position of the sun, and climatic conditions.

Masonry construction is, however, costly and time-consuming to employ. Moreover, brick typically has a long lead time to procure, and hence the application of a brick finish can be a bottleneck in building construction if the desired brick is not readily available. To address these cost and supply concerns, various alternative approaches to brick veneer have been developed. Simulated brick treatments are applied to wall surfaces to create an appearance which is similar to that of brick, but at an advantageous cost and of readily available materials. Moreover, simulated brick treatments usually weigh less than brick or stone veneers, and thus impose lesser loads on the building's framework, allowing a cost savings in structural material such as steel.

One simulated brick surface or variable depth building surface is marketed as the SystemBrick® cladding system offered by Cubic Industries, Inc. of McFarland, Wis. The SystemBrick cladding system uses a base layer which is applied to the exterior of the building finish which has the color and texture of intended mortar joints. A template with openings in the shapes of building materials which are to be simulated is positioned over the base layer and fixed in place by an adhesive backing on the template. The openings in the template in the desired shapes are used to stencil the shapes using a second layer or coating of material which has the appearance of common construction materials such as brick, stone, or tile. A stencil for brick will have a regular array of rectangular openings within the template. The template itself is typically formed of a heavy wax impregnated paper such as used in milk cartons. The template material forms strips of material between the openings which are used to stencil the patterns. After the second layer of coating has been applied to the stencil template, and the second layer has set sufficiently so as to remain in place, the stencil is removed and the base layer has an appearance of mortar between the stenciled bricks or stones.

Applied by skilled craftsman, this prior art technique can produce a remarkable simulation of brick, stone, or tile, and can be a very cost-effective alternative to masonry. However, the paper templates of the prior art can be time-consuming to remove, as the paper is prone to tearing in the process of removal, especially if the second layer of coating has been allowed to set for too long. Rarely is it possible to remove the template in a single operation.

What is needed is a template which can effectively be used in a brick, stone, or tile simulative wall covering or other variable depth building surface which can be removed with minimal tearing and fragmentation.

SUMMARY OF THE INVENTION

The template of this invention is formed of nonwoven spunbond polyester material. The template when used in a conventional process of forming a variable depth building surface, such as a simulation of common construction materials such as brick, stone, or tile building surfaces, expedites the application of the stencil pattern because the template is of high strength which facilitates rapid removal of the template after the application of the exterior color layer. The material may be reinforced with strands or reinforcing, such as fiberglass.

It is an object of the present invention to provide a template for the preparation of a variable depth building surface which is effectively removed from the wall surface with minimal fragmentation.

Further objects, features and advantages of the invention will be apparent from the following detailed description when taken in conjunction with the accompanying drawings.

DESCRIPTION OF THE PREFERRED EMBODIMENTS

Figure 1:
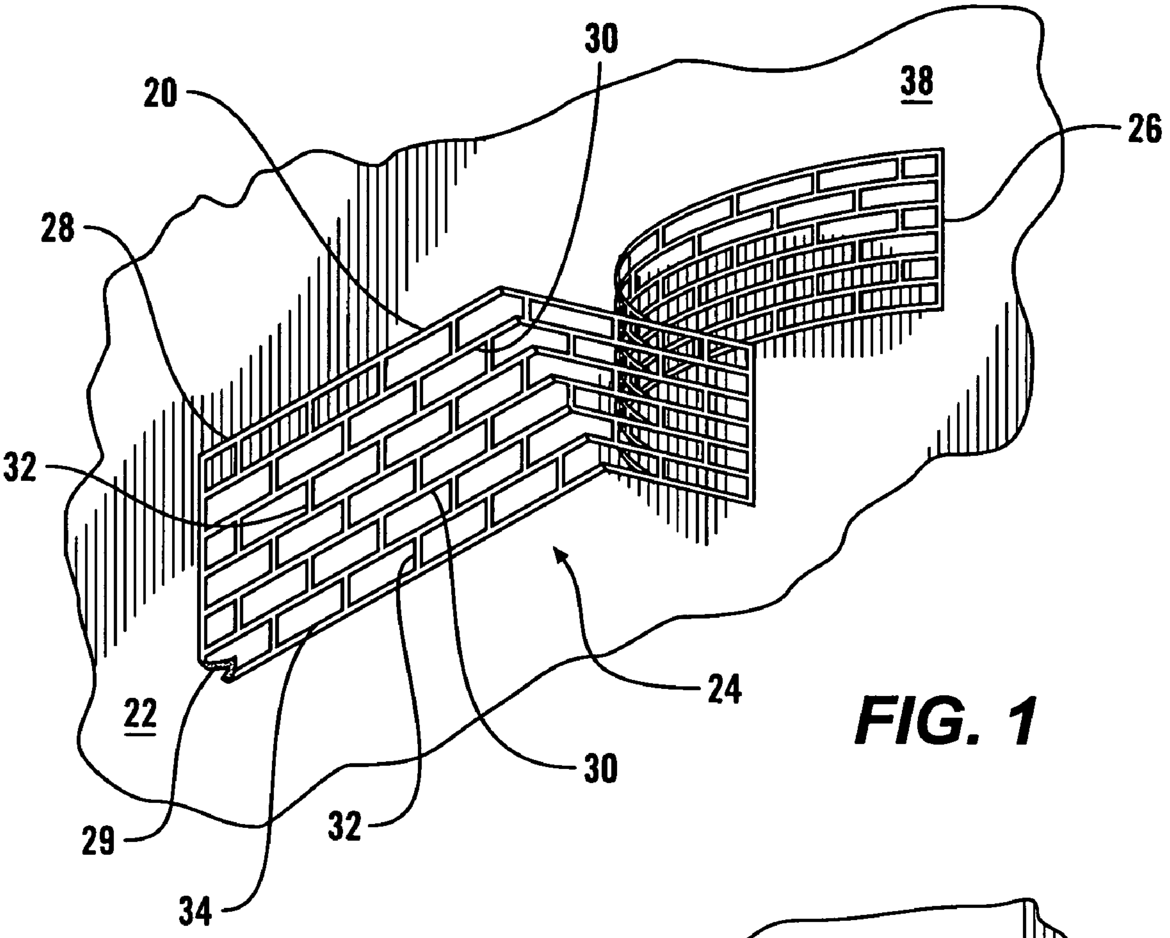
FIG. 1 is an isometric view of a template of this invention being applied to a wall in the course of preparing a wall treatment system on a structure.
Figure 2:
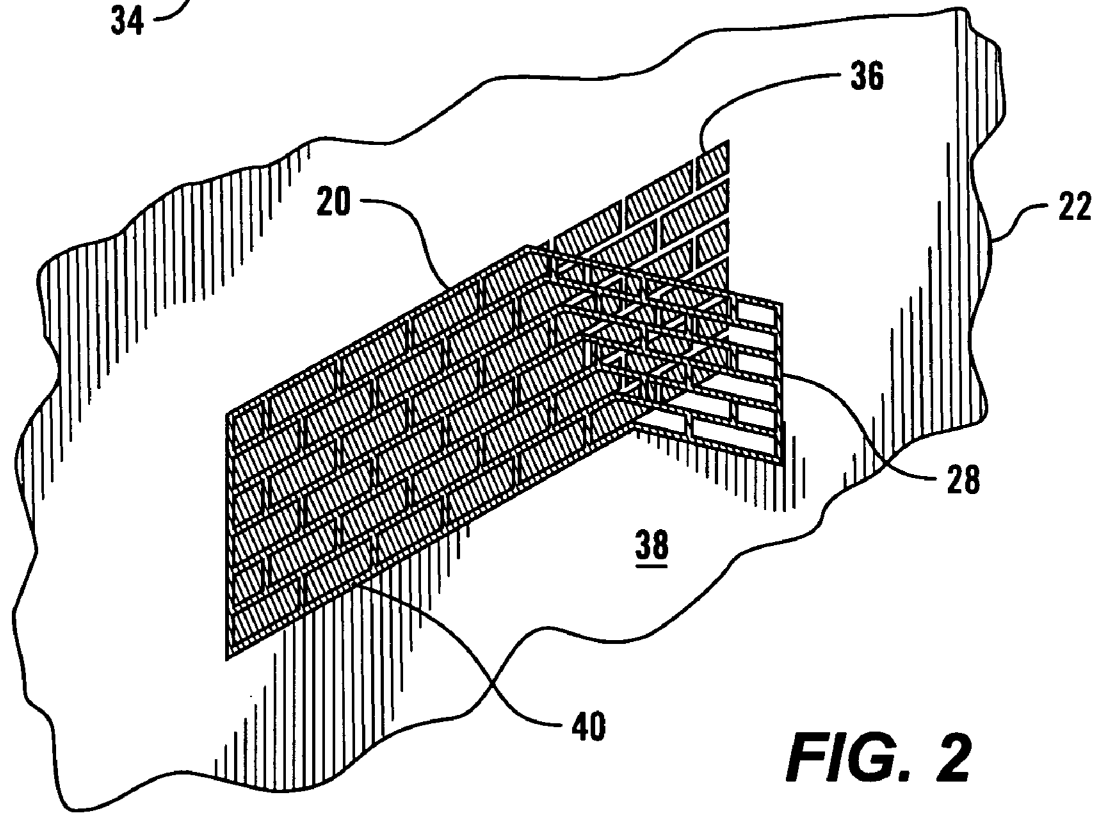
FIG. 2 is an isometric view of the template of this invention being removed from the wall treatment system of FIG. 1.

Referring more particularly to FIGS. 1-2, wherein like numbers refer to similar parts, a template 20 is shown applied to a wall surface 22. The template 20 is provided to an installer as part of a template assembly 24 comprised of the adhesive backed template connected to a release liner backing sheet 26. The template 20 is formed from a substrate 28 which is a cut sheet of substrate material 28 having a pressure-sensitive adhesive coating 29 or other type of adhesive.

The adhesive may be an acrylic based adhesive or a rubber based adhesive, or other adhesive selected to adhere to the wall surface to which the template is intended to be temporarily attached. An aggressive adhesive, for example, may be used when the template is being attached to a rough wall surface.

The backing sheet 26 is cut to the same outline as the substrate 28 and protects the adhesive until use, at which point the backing sheet 26 is releasably removed from the substrate 28 without impairing the adhesive backing of the substrate. The substrate material is a nonwoven spunbond material, which may be a fiberglass reinforced nonwoven spunbond polyester material, for example, F250-1 fiberglass reinforced polyester nonwoven material manufactured by Freudenberg Texbond LP, or Johns Manville Polyester Spunbond Type 033/250.

The substrate material may be about 30-80 mils thick, preferably about 50 mils thick. This material performs effectively as a template material because of its resistance to tearing when it is peeled off of a wall surface. Typical tensile strengths of this material are about 70 lbsf/in in the machine direction (the direction of running of the material web in its manufacture) and 60 lbsf/in in the cross-machine direction (the direction perpendicular to the machine direction). The material also has desirable dimensional stability of about −0.50 percent. Preferably, the backing sheet 26 and the substrate 28 are fashioned, such as by die-cutting, routing, or other fabricating technique, to a desired shape after the two sheets are joined together.

The template 20 is a single unitary item, but it has an array of narrow sidewardly extending strips 30 and upwardly extending strips 32 of substrate material which correspond to those places on a wall where it is desired to simulate mortar joints or some other pattern. The template is preferably of a size to include multiple unit openings, for example 24 inches by 60 inches. However, many different sizes may be constructed, depending on the particular application. It should be noted that although the template of this invention may be used in simulating bricks, stone, tile, or mosaic separated by mortar or grout joints, the template can be used to fabricate a variety of variable depth building surfaces, even those which do not simulate conventional building materials. For example, words, logos, or images can be formed which are recessed from the surrounding wall surface.

Openings 34 are defined between the strips 30, 32, which correspond to the simulated blocks 36. The openings 34 in the template are used to form the stenciled shapes of bricks, or stone blocks, which simulate the appearance of stones or bricks. The templates 20 may be formed with a variety of patterns to simulate different arrangements, sizes, and compositions of brick, block, tile, mosaic, or stone material. An example of a template 20, such as shown in the figures, has a regular array of generally rectangular openings 34 separated by ⅜ inch strips of substrate material. However, it should be noted that the openings 34 may be of any desired size and shape, simulating the appearance of various common brick or stone patterns, or of very specialized brick patterns, for example, patterns specifically designed to suit a particular building project. The patterns may even be designed to simulate irregular patterns, such as a random rubble stone surface treatment or a mosaic.

The templates 20 are used in the construction trades when it is desired to produce on the surface of a structure a variable depth building surface, such as one that simulates the appearance of brick, stone, tile, mosaic or other masonry with intervening mortar or grout joints.

In a typical use of the templates 20, a first layer of material 38 is applied to the wall surface to be treated. The wall surface may be on the exterior of a building, or it may be an interior surface, such as drywall or plywood. This first layer will define the appearance of those regions of the wall coating that have the pattern of the template strips. For example, the first layer may be chosen to be simulative of the look of a mortar or grout joint. The first layer 38 may be a different color or texture than the later layer, if desired. The first layer may be comprised of a material which includes fillers such as sand and colorants and may be rolled or sprayed on or applied in any conventional fashion. The surface may be uniform in color, or variegated.

The template 20 is prepared for attachment to the dried first layer by pulling away the backing sheet 26 from the adhesive layer on the template. The template 20 is then applied by sticking the adhesive layer to the first layer of material on the wall. The dry surface to which the template is applied should not be overly dusty.

A second layer of of material 40 is then applied over the template 20 and over the first layer of material 38. The second layer 40 may be of different color or texture than the first layer 38, or it may be similar. The second layer 40 may be built up to whatever depth is desired over the first layer 38, to give the desired degree of depth variation in the variable depth building surface. The second layer may include multiple applications of coatings of the same or different coatings, especially where it is desired to simulate the variegated appearance of natural stone or brick. As bricks and stones are not uniform in color, but are generally mottled or streaked, various artistic techniques of color application can be used to approximate the appearance and color variations found in the particular type of brick or stone which it is desired to simulate.

As shown in FIG. 2, after the desired second layer 40 has been applied, the template 20 is then removed. If required, any sealant required may then be applied. The template 20 preferably is left in place until the first layer material 38 has dried, resulting in a sharp edge to the raised simulated blocks 36. Preferably, the template will be removed within one to three days after application. However, the templates may be removed while the second layer is still wet. The templates 20 are removed manually by an installer engaging one corner of the template 20, and peeling it across the building surface. Because of the strength of the template substrate 28, the template can hold together under the force of being peeled from the wall surface, with the result that in most cases the template 20 can be peeled off as a unitary element, in a matter of seconds.

A test was conducted comparing the time to remove templates fabricated of the prior art wax-impregnated material, as compared to templates of the same size and shape but fabricated of the material of this invention, both tests being performed by the same experienced installer. In a comparative field test, an installer was able to remove about 1.8 square feet per minute of the prior art template, as compared to about 15.6 square feet per minute of the template of this invention.

It is understood that the invention is not limited to the particular construction and arrangement of parts herein illustrated and described, but embraces all such modified forms thereof as come within the scope of the following claims.

I claim:

1. A template assembly for use in the production of a variable depth building wall surface, the template assembly comprising:

a substrate of nonwoven spunbond polyester material, the substrate being a unitary sheet having portions which define a plurality of openings, wherein the substrate has portions which extend between the openings to form strips which separate the openings from one another; and an adhesive layer applied to a rear surface of the substrate.

2. The template assembly of claim 1 further comprising a releasable backing sheet applied to the adhesive layer.

3. The template assembly of claim 1 wherein the substrate is about 30-80 mils thick.

4. The template assembly of claim 1 wherein the substrate is formed of fiberglass reinforced polyester nonwoven material.

5. A wall surface template assembly comprising:

a wall surface having applied thereto a first layer of material;

a template having a substrate of nonwoven spunbond polyester material, the substrate being a unitary sheet having a plurality of upwardly extending strips connected by a plurality of sidewardly extending strips, a plurality of openings being defined between the upwardly extending strips and the sidewardly extending strips, the template being adhesively attached to the wall surface first layer of material; and a second layer of material applied to overlie the template and the first layer of material.

6. The assembly of claim 5 wherein the substrate is about 50 mils thick.

7. The template assembly of claim 5 wherein the substrate is formed of fiberglass reinforced polyester nonwoven material.

* * * * *